(12) United States Patent
Rötzer et al.

(10) Patent No.: US 11,472,345 B2
(45) Date of Patent: Oct. 18, 2022

(54) REARVIEW DEVICE AND MOTOR VEHICLE WITH REARVIEW DEVICE

(71) Applicant: MOTHERSON INNOVATIONS COMPANY LIMITED, London (GB)

(72) Inventors: Ilka Rötzer, Kemnath (DE); Peter Hein, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/268,157

(22) PCT Filed: Aug. 7, 2019

(86) PCT No.: PCT/EP2019/071247
§ 371 (c)(1),
(2) Date: Feb. 12, 2021

(87) PCT Pub. No.: WO2020/035374
PCT Pub. Date: Feb. 20, 2020

(65) Prior Publication Data
US 2021/0245664 A1    Aug. 12, 2021

(30) Foreign Application Priority Data
Aug. 16, 2018   (DE) .................. 10 2018 119 948.1

(51) Int. Cl.
*B60R 1/12*   (2006.01)
*B60R 1/08*   (2006.01)

(52) U.S. Cl.
CPC ............... *B60R 1/12* (2013.01); *B60R 1/08* (2013.01); *B60R 2001/1253* (2013.01); *B60R 2300/8026* (2013.01)

(58) Field of Classification Search
CPC ...... B60R 1/12; B60R 1/08; B60R 2001/1253; B60R 2300/8026; B60R 1/00
See application file for complete search history.

(56) References Cited

U.S. PATENT DOCUMENTS

| 2016/0250974 | A1 | 9/2016 | Kuester et al. |
| 2017/0033449 | A1* | 2/2017 | Talty .................. H01Q 1/3275 |
| 2017/0036599 | A1 | 2/2017 | Siddiqui et al. |
| 2018/0079365 | A1 | 3/2018 | Kuester |

(Continued)

OTHER PUBLICATIONS

International Search Report dated Nov. 7, 2019 of International application No. PCT/EP2019/071247.

(Continued)

*Primary Examiner* — James M Pontius
(74) *Attorney, Agent, or Firm* — Jones Day

(57) ABSTRACT

A rearview device for a motor vehicle includes a camera arrangement for capturing a rearward traffic situation and a motor vehicle includes such a rearview device and a method for operating such a rearview device with an output unit which is partially reflective at least in regions, in particular a screen on which the rearward traffic situation captured by the camera arrangement is displayed as a camera image or this is visibly displayed by means of a conventional mirror image in the absence of a camera image and having a control unit for determining a degree of impairment of the camera image, the control unit, when a predetermined degree of impairment of the camera image is exceeded.

17 Claims, 3 Drawing Sheets

(56) References Cited

U.S. PATENT DOCUMENTS

| | | |
|---|---|---|
| 2018/0170264 A1 | 6/2018 | Ishii et al. |
| 2018/0370455 A1* | 12/2018 | Daujotas ................. B60R 11/04 |
| 2019/0126831 A1* | 5/2019 | Arciniaga ................. B60R 1/12 |
| 2020/0130583 A1* | 4/2020 | Kanagaraj ................. B60R 1/12 |
| 2020/0180511 A1* | 6/2020 | Kanagaraj ................. B60R 1/12 |

OTHER PUBLICATIONS

Written Opinion dated Nov. 7, 2019 of International application No. PCT/EP2019/071247.
European Patent Office, Application No. 19 758 905.4, Office Action dated May 6, 2022.

* cited by examiner

REARVIEW DEVICE AND MOTOR VEHICLE WITH REARVIEW DEVICE

CROSS-REFERENCE TO RELATED PATENT APPLICATIONS

This application is a National Stage Entry of International Patent Application No. PCT/EP2019/071247, filed, Aug. 7, 2019, which claims the benefit of priority to German Patent Application No. DE 10 2018 119 948.1, filed Aug. 16, 2018, each of which is hereby incorporated by reference in its entirety for all purposes.

BACKGROUND

1. Field of the Invention

The invention relates to a rearview device for a motor vehicle comprising a camera arrangement for detecting a rearward traffic situation, as well as a motor vehicle with such a rearview device and a method for operating such a rearview device.

2. Related Art

Rearview devices such as rear-view mirrors with a reflective surface in or on motor vehicles make it easier for the driver of the motor vehicle to observe the rearward traffic situation and make driving a motor vehicle safer. The aim of rearview devices is to make an area behind the vehicle as large as possible visible. In modern motor vehicles, reflective rearview devices are increasingly being supplemented or completely replaced by camera arrangements in which the image recorded by a camera is displayed on a corresponding screen or monitor for the driver. The capturing camera is usually exposed to weather and other contaminating influences. In order for the rearview device to be able to reliably depict the rearward traffic situation using a camera image, it must be ensured that the cameras used do not have any dirt residues on the camera itself or on transparent protective covers arranged in the light path of the camera, preventing the capturing of the rearward traffic situation or at least impairing it to such an extent that the driver can no longer observe the rearward traffic situation with the required clarity. For this purpose, camera arrangements can be provided with cleaning devices that are intended to ensure reliable capturing of a clear image of the rearward traffic situation while the motor vehicle is in motion. Nevertheless, during a drive, soiling of the camera arrangement can suddenly lead to a loss of the complete view of the traffic event displayed on the rearview device by means of camera and monitor image, for example due to splashing dirt, which can possibly lead to incorrect reactions on the part of the driver and thus to critical traffic situations. Other causes alone or in addition can also negatively influence a representation of the rearward traffic situation by means of the camera arrangement.

It would therefore be desirable to have a rearview device using a camera arrangement available in which even an impairment of the camera image that is intolerable for the comprehensive observation of the rearward traffic situation does not lead to a loss of the possibility of observing the rearward traffic situation and thus an avoidance of critical traffic situations due to an insufficient camera image is possible.

SUMMARY

It is therefore a problem of the invention to provide a rearview device using a camera arrangement, in which even an impairment of the camera image, which is intolerable for the comprehensive observation of the rearward traffic situation, does not lead to a loss of the possibility of observing the rearward traffic situation and thus an avoidance of critical traffic situations caused thereby is made possible.

This problem is solved by a rearview device for a motor vehicle comprising a camera arrangement for detecting a rearward traffic situation and an output unit connected to the camera arrangement, on which the rearward traffic situation captured by the camera arrangement is displayed as a camera image at least for a driver of the motor vehicle, the output unit being an output unit which is partially reflective at least in regions and which, without a displayed camera image, visibly displays a conventional mirror image of the rearward traffic situation at least in regions of the output unit and, in the switched-on state, displays a camera image with suitable image properties, which make the conventional mirror image appear at least predominantly invisible, and wherein the rearview device additionally comprises a control unit for determining a degree of impairment of the camera image, wherein the control unit, when a predetermined degree of impairment of the camera image is exceeded, automatically controls the output unit in such a way that the camera image is no longer displayed on the output unit and instead the output unit displays the rearward traffic situation by means of a conventional mirror image.

The state of the output unit where the camera image is no longer displayed on the output unit can, for example, correspond to a state in which the output unit is switched off. However, the output unit does not necessarily have to be switched off for a state without a displayed camera image, but can also merely provide no camera image, for example in a so-called stand-by mode. The rearview device with the output unit can be arranged, for example, inside the passenger compartment as a camera-assisted interior rear-view mirror, outside the passenger compartment as a camera-assisted exterior rear-view mirror, or as a rearview device arranged elsewhere. The term "output unit" refers to all devices suitable for displaying (mapping) camera images. In this context, the output unit may be designed as a separate device or may be a unit integrated into a housing or component of the motor vehicle. In one embodiment, the output unit is a screen or a monitor.

The control unit of the rearview device can thereby determine the degree of impairment of the camera image integrally for the entire image area of the camera image, for locally for selected positions, for individual pixels of the camera image or for a plurality of sub-areas in the camera image, depending on the embodiment. The control unit is, for example, a computer chip with a corresponding evaluation algorithm installed and executed thereon for determining the degree of impairment of a camera image. Appropriate image evaluation software may be used for this purpose. Reaction sequences according to the invention are also installed on the control unit, so that the control unit can automatically control the output unit accordingly based on the results of the evaluation algorithm. In this context, the term "partially reflective" refers to a reflectivity of the displaying surface of the output unit that is set such that the intensity of the mirror image reflected by the displaying surface is suitably lower than the intensity of the camera image displayed by the output unit, so that the viewer, in this case for example the driver, perceives the displayed camera image mainly or exclusively instead of the mirror image when the two images are superimposed. The output unit can be partially reflective in areas (sections smaller than the total surface of the output unit) or over the entire surface. In order for the output unit to no longer display the camera image in the event of an excessive degree of impairment of the camera image, this and/or the camera arrangement can be switched off and/or the camera signal can be suppressed or switched off as an input signal for the output unit. Impairment of the camera image may be caused, for example, by local contamination on the camera arrangement, by image errors due to electronic interference, or by pixel errors of the output unit or failure of image lines in the output unit. The impairment of the camera image can also be caused by a superposition of different causes, e.g. areas of the camera image cannot show the rearward traffic situation due to soiling, while at the same time other areas may show other image errors, so that the overall degree of impairment is so high that the display of the camera image on the output unit is switched off in favor of the display by means of a mirror image.

Checking for any impairment of the camera image ensures that the rearward traffic situation captured by the displayed camera image is displayed clearly and distinctly, e.g. for the driver. If the displayed camera image no longer exhibits this quality, switching off the camera image and then displaying the rearward traffic situation by means of reflection of the light incident from behind on the output unit, for example on the displaying surface of the output unit, provides a reliable and sufficient possibility for the driver of the motor vehicle, for example, to continue observing the rearward traffic situation without loss of information.

Thus, the rearview device with camera arrangement according to the invention makes it possible that, in the event of an impairment of the camera image that is intolerable for the comprehensive observation of the rearward traffic situation, a loss of the possibility of observing the rearward traffic situation does not occur and thus avoids the occurrence of critical traffic situations caused thereby.

In one embodiment, the degree of impairment of the camera image is caused (a) due to a contamination of the camera arrangement and/or (b) due to one or more non-contamination-related disturbances from the group of a low charging status of an electric battery in an electric vehicle, a jerky camera image, a flickering camera image, a flickering camera image, a still image, or an EMC (Electromagnetic compatibility) effect. Contamination of the camera arrangement can occur at any time during a drive of the motor vehicle, if necessary also suddenly (driving through a puddle etc.) and represents a large source of error for the impairment of camera images in a rearview device. In this case, the control unit both evaluates the degree of contamination in the camera image of the camera arrangement and also controls the output unit according to the determined degree of contamination as specified. For example, the predetermined degree of impairment may be exceeded if 20% or more of the entire camera image is impaired by dirt. The predetermined degree of impairment may also be exceeded, for example, if 10% or more of the camera image is impaired in certain areas, such as the area around the center of the image. Here, the percentage refers to the proportion of the impaired area of the camera image to its total area on the output unit. An area can be considered "impaired" if the transmission of the actual camera image through the contamination is more than 50% less in this area than in non-soiled areas. In particular, an area is impaired if the transmission is less than 10% of the transmission in non-impaired areas, for example at 0% transmission. In the case of other non-contamination-related interference that can affect the observation of rearward traffic situation, the camera image is also no longer displayed on the output unit.

In this context, EMC interference refers to electromagnetic interference signals that can penetrate the system from outside and generate problems, be it via a cell phone, a radio mast, or the like. Here, too, the predetermined degree of impairment may be exceeded, for example, if 20% or more of the entire camera image can no longer be displayed due to this interference. The predetermined degree of impairment can also be exceeded, for example, if 10% or more of the camera image is disturbed in certain areas, for example in the area around the center of the image. This further increases road safety, for example, by preventing the driver from being incorrectly offered an incorrect or out-of-date image of the rearward traffic situation. Here, the control unit immediately sends a signal to the output unit when an error is captured and switches it off.

In a further embodiment, the control unit is designed to determine the degree of impairment of the camera image in a two-dimensional arrangement of measuring areas in the camera image separately for each measuring area. In this context, the term "measuring area" refers to an area of the camera image that represents a section or sub-image of the entire camera image. Adjacent measuring areas can have the same degree of impairment, but can also have significantly different degrees of impairment. In addition to an integral degree of impairment, a position-dependent relevance of the impairment for the observability of the rearward traffic situation can be determined by the degrees of impairment determined separately for the individual measuring areas.

In another embodiment, the two-dimensional arrangement of measuring areas covers the entire camera image. This means that any form of impairment can be captured and evaluated regardless of its position.

In a further embodiment, the measuring areas are arranged across the camera image and are in a square or rectangular shape with an edge ratio of smaller edge to larger edge of more than 50%. Thus, the measuring areas have a regular shape so that a matrix of measuring areas can be formed which can evenly cover, for example, the entire camera image, so that all areas of the camera image are evaluated based on the measuring areas.

In another embodiment, the two-dimensional arrangement comprises a central main field of multiple measuring areas covering a central region of the camera image. In this context, the term "central main field" refers to an area around the center of the camera image. This means that the measuring areas in the center of the camera image can be given particular weighting for determining a degree of impairment, since the center of the image provides the greatest amount of information for observing the rearward traffic situation.

In a further embodiment, the control unit is designed to regard one of the measuring areas as impermissibly impaired if the predetermined degree of impairment for this measuring area is exceeded. In impermissibly impaired measuring areas, the rearward traffic situation can no longer be observed to the extent necessary for safe driving. The reason for the impairment may vary from measuring area to measuring area. For example, some measuring areas may no longer be able to correctly display the rearward traffic situation due to contamination of the camera arrangement, while other measuring areas may also no longer be able to correctly display the rearward traffic situation due to image errors, pixel errors, etc.

In a further embodiment, the control unit is configured to no longer display the camera image on the output unit if 20% or more of the measuring areas are considered impermissibly impaired or if 10% or more of the measuring areas in the central main field are considered impermissibly impaired. The percentages here refer to the proportion of the impaired area of the camera image to its total area on the output unit. For camera images with a higher degree of impairment, the safety risk due to unclear and/or incomplete images of the rearward traffic situation would increase significantly if the camera image continues to be used in the rearview device. The weighting of impaired to non-impaired areas with regard to the effect on the displayed overall camera image is simple and reliable, especially with the weighting method specified above. The evaluation of the number of impaired measuring areas can be performed based on a specific cause of impairment or for all different causes of impairment. For example, an only slightly dirty camera arrangement can cause a non-critical number of impaired measuring areas, so that the camera image continues to represent the rearward traffic situation sufficiently accurately and reliably, so that there is no increased safety risk for the driver of the motor vehicle. The same could be the case, for example, with a small number of image errors in the camera image. If additional image errors occur when the camera arrangement is slightly dirty, or if the camera arrangement becomes even dirtier when image errors are already present, the overall degree of impairment could be too high, so that the camera image is no longer displayed on the output unit and the mirror image takes over the display task instead.

In another embodiment, the control unit is designed to continuously determine the degree of impairment of the camera image. This prevents the driver from being deprived of a view of the rearward traffic situation at any time during the vehicle's operating time due to sudden impairments (e.g. soiling or sudden image errors). This ensures driving safety during the entire operating time and prevents the vehicle from shutting off. According to a standard, two mirrors must always be operational, for example one of the two exterior mirrors and the interior mirror.

In one embodiment, the output unit is a full-surface partially reflective output unit that visibly displays a conventional mirror image over the entire output unit without a displayed camera image. With this full-surface representation of the rearward traffic situation, the driver still retains a good overview of the rearward traffic situation even with a reflective display without a camera image. The visible display here means that the mirror image is now visible to the viewer when the camera image is absent, and the reflectivity of the output unit is adapted accordingly for this. However, the reflectivity must not be so high that the mirror image is superimposed on the camera image when the camera image is displayed.

In order for the output unit to obtain its partially reflective property, a partially transparent film or layer with reflective properties can be applied directly to the output unit on the side facing the viewer, for example. In order for this partially transparent layer or film to be applied to the output unit, the output unit is suitably freed from dirt, dust, grease, fingerprints and/or other contamination at least on the side facing the subsequent viewer, is inserted into a placement machine and its dimensions are measured at least with respect to the side to be coated with the film or layer using a measuring device. In the case of a film to be applied, the film is cut to size, for example punched out of a partially transparent film, placed in the correct position and positioned for the application step. The film and the presenting surface of the output unit are then wetted with a liquid and the wet film is brought into contact with the wet presenting surface and laminated to each other. By unrolling the film from the side and using an elastic roller, the film is pressed onto the output unit, thereby applying the film to the output unit without bubbles. Excess liquid can now be removed. The reflective layer applied in this way now lies on the displaying surface and, by measuring, is precisely adapted to the size of the output unit and its screen area. The edges of the film or the output unit can then be laminated and fixed by a frame. The partially reflective film can be a reflective layer of titanium oxide, nickel-chromium or other materials that reflect visible light. The reflectivity of the film can be adjusted, for example, via the thickness of the reflective layer.

The output unit may additionally comprise other features such as a protective layer (for example against mechanical stress), a heatable layer (for example for rearview devices located outside the passenger compartment), or an integrated antenna, for example in the protective layer or the partially reflective foil. In addition, the protective layer and/or the partially reflective film may include milled and/or etched-out so-called icons, images and/or warnings and/or symbols, for example compass, time, etc.

The invention further relates to a motor vehicle having at least one rearview device according to the invention. The term motor vehicles refers to all motorized vehicles with rearview devices.

The invention further relates to a method for operating a rearview device according to the invention for a motor vehicle comprising a camera arrangement, an output unit connected to the camera arrangement and at least partially reflecting in areas, and a control unit, comprising the following steps:

capturing a rearward traffic situation with the camera arrangement;

displaying the rearward traffic situation captured by the camera arrangement as a camera image for a driver of the motor vehicle on the output unit with suitable image properties that make a conventional mirror image of the partially reflective output unit at least predominantly invisible;

determining a degree of impairment of the camera image by the control unit;

automatically activating the output unit by the control unit in such a way that when a predetermined degree of impairment is exceeded, the camera image is no longer displayed on the output unit; and visible imaging of the rearward traffic situation at least in areas on the output unit by means of the conventional mirror image of the rearward traffic situation.

The output unit can be a screen or monitor, for example.

Thus, the method according to the invention for operating a rearview device according to the invention for a motor vehicle makes it possible that, in the event of an impairment of the camera image that is intolerable for the comprehensive observation of the rearward traffic situation, a loss of the possibility of observing the rearward traffic situation does not occur and thus avoids the occurrence of critical traffic situations caused thereby.

In one embodiment of the method, the degree of impairment of the camera image is caused due to the contamination of the camera arrangement.

In one embodiment of the method, the degree of impairment of the camera image in a two-dimensional arrangement of measuring areas in the camera image is determined separately for each measuring area by the control unit.

In one embodiment of the method, the control unit considers one of the measuring areas to be impermissibly impaired if the predetermined degree of impairment for this measuring area is exceeded. The impermissible impairment can be caused, for example, by local contamination on the camera arrangement concerning the corresponding measuring area in the camera image, by image errors due to electronic interference or pixel errors of the output unit.

In one embodiment of the method, the control unit no longer displays the camera image on the output unit when 20% or more of the measuring areas are considered impermissibly impaired or when 10% or more of the measuring areas in the central main field are considered impermissibly impaired.

In one embodiment of the method, this comprises the further step of no longer displaying the camera image on the output unit if there is a non-contamination-related disturbance that can impair the observation of the rearward traffic situation.

In one embodiment of the method, the control unit detects a removal of the contamination or non-contamination-related disturbance and switches the output unit on again in response. This means that the display of the rearward traffic situation can be switched back to the electronic display without any loss of time.

In one embodiment of the method, the control unit continues to check the camera images frame-by-frame while the output unit is switched off or is in a stand-by mode to determine whether the contamination or non-contamination-related disturbance has been removed. This makes it possible to determine without delay whether the impairment of the camera image continues or has been removed.

In one embodiment of the method, the driver of the motor vehicle manually specifies whether the rearview device is to be operated in an electronic mode by means of displaying the rearward traffic situation captured by the camera arrangement as a camera image or in a reflective mode by means of visible imaging of the rearward traffic situation at least in areas on the output unit by means of the conventional mirror image, with the electronic mode always being set by default when the motor vehicle is put into operation. In this way, the driver retains control over the display mode for the rearward traffic situation.

The embodiments listed above can be used individually or in any combination with each other to form the device according to the invention and the method according to the invention.

BRIEF DESCRIPTION OF THE DRAWINGS

These and other aspects of the invention are shown in detail in the figures as follows.

DETAILED DESCRIPTION

Figure 1:
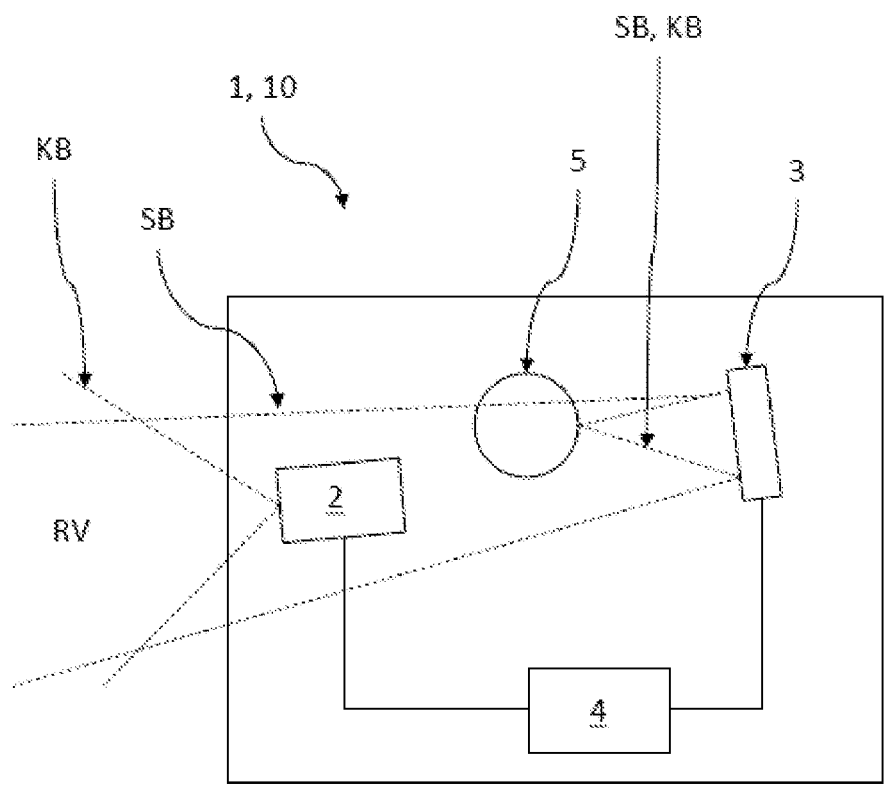
FIG. 1 is a schematic representation of an embodiment of the rearview device according to the invention or of the motor vehicle according to the invention with such a rearview device.

FIG. 1 shows a schematic representation of an embodiment of the rearview device 1 according to the invention and/or of the motor vehicle 10 according to the invention with such a rearview device 1 comprising a camera arrangement 2 for detecting a rearward traffic situation RV and an output unit 3 which is connected to the camera arrangement 2 via one or more suitable data connections (wireless or cable-supported) and which is designed here as a screen 3 on which the rearward traffic situation captured by the camera arrangement 2 is displayed as a camera image KB at least for a driver 5 (shown here symbolically with a circle as head) of the motor vehicle 10, wherein the screen 3 is a screen 3 which is partially reflective at least in regions (here over its entire surface facing the driver) and which, without a displayed camera image KB, visibly displays a conventional mirror image SB of the rearward traffic situation RV by means of its partially reflective surface and, in the switched-on state, displays a camera image KB with suitable image properties which make the conventional mirror image SB appear at least predominantly invisible. In addition, the rearview device 1 comprises a control unit 4, for example comprising a suitably designed processor with an evaluation algorithm installed and executed thereon, for determining a degree of impairment BG of the camera image KB. In this case, the control unit automatically controls the screen 2 via a suitable data link in such a way that the camera image KB is no longer displayed on the screen 3 when a predetermined degree of impairment VBG of the camera image KB is exceeded. For this purpose, for example, the screen 3 or the camera arrangement 2 can be switched off by the control unit 4 so that there is no longer any camera signal, or the transmission of the camera signal for displaying the camera image KB on the screen 3 can be interrupted by the control unit 4. Instead, the screen 3 then displays the rearward traffic situations RV by means of conventional mirror image SB visible to the driver. The degree of impairment BG of the camera image KB can be caused, for example, by soiling of the camera arrangement 2, the degree of soiling determining the degree of impairment. In addition to soiling, other causes can also lead to impairment of the camera image, such as electronic image errors. The control unit 4 is thereby designed to continuously determine the degree of impairment BG of the camera image KB. The screen 3 shown here is a full-surface partially reflecting screen 3 which, without a displayed camera image KB, displays a conventional mirror image SB visibly over the entire screen 3. The control unit 4 is also provided here for additionally no longer displaying the camera image KB on the screen 3 in the event of other non-contamination-related disturbances which may impair observation of the rearward traffic situation RV, wherein the non-contamination-related disturbance may be a disturbance from the group of a low charging status of an electric battery in an electric vehicle, a jerky camera image, a flickering camera image, a flickering camera image, a still image or an EMC effect.

Figure 2:
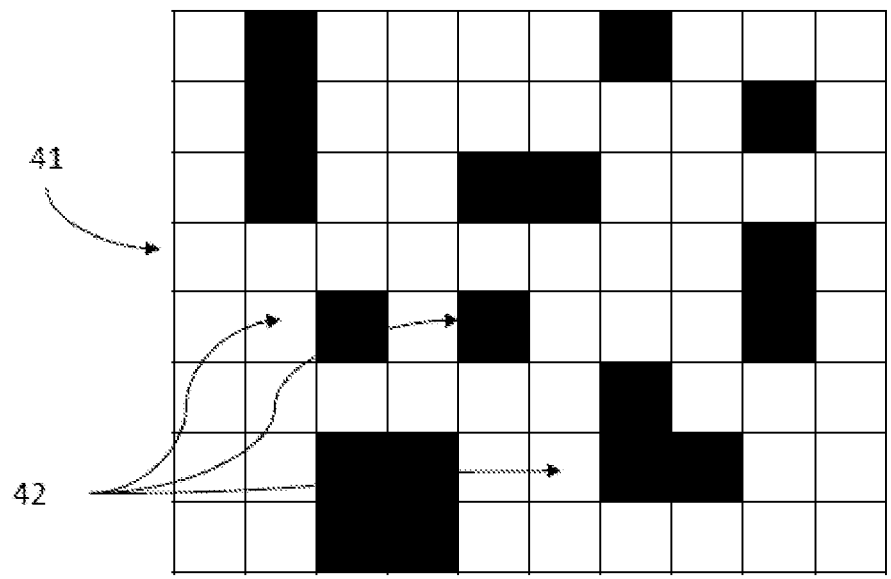
FIG. 2 is a schematic representation of an embodiment of a two-dimensional arrangement of measuring areas over the entire camera image.

FIG. 2 shows a schematic representation of an embodiment of a two-dimensional arrangement 41 of measuring areas 42 over the entire camera image KB, which are used to determine the degree of impairment in the camera image KB. Here, the control unit 4 is configured to determine the degree of impairment BG of the camera image KB in a two-dimensional arrangement 41 of measuring areas 42 in the camera image KB separately for each measuring area 42. The two-dimensional arrangement 41 of measuring areas 42 covers the entire camera image KB. The measuring areas 42 are selected to be square or rectangular with an edge ratio of smaller edge to larger edge of more than 50% over the camera image KB. The control unit 4 is thereby designed to regard one of the measuring areas 42 as impermissibly impaired (shown here in dark as an example) if the predetermined degree of impairment VBG is exceeded for this measuring area 42. The remaining measuring areas 42 which, after image analysis by the control unit 4, are regarded as not impaired and thus as suitable by the control unit 4 for displaying the rearward traffic situation RV, are shown here in white by way of example. The control unit 4 can be designed to no longer display the camera image KB on the output unit 3 if 20% or more of the measuring areas 42 over the entire area of the analyzed camera image KB are considered to be impermissibly impaired.

Figure 3:
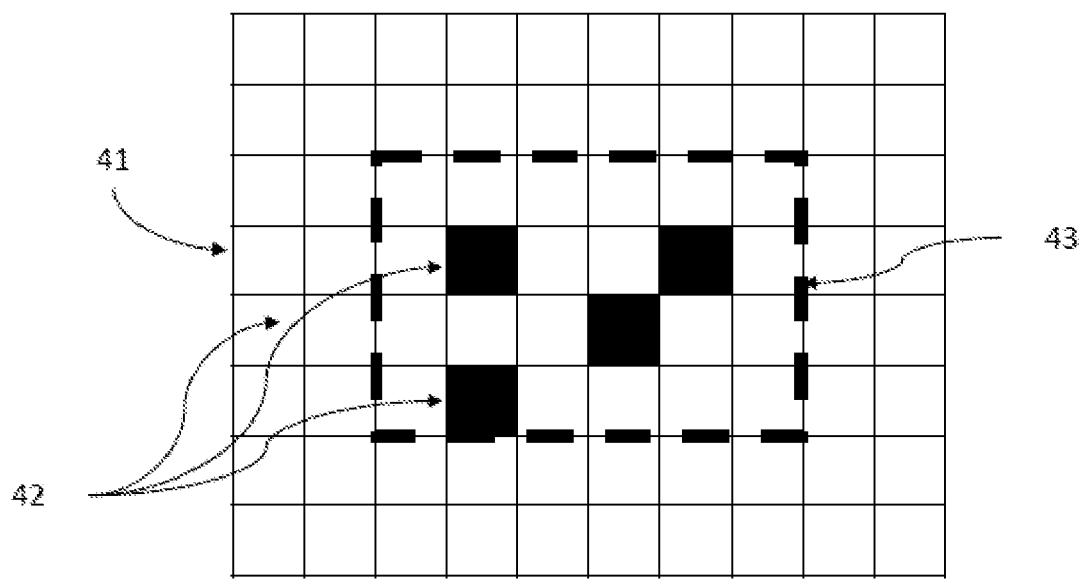
FIG. 3 is a schematic representation according to FIG. 2 with central main field consisting of several measuring areas.

FIG. 3 shows a schematic representation according to FIG. 2 with a central main field 43 consisting of several measuring areas 42. The two-dimensional arrangement 41 here comprises a central main field 43 (shown thickly dashed in black) with several measuring areas 42, which covers a central area of the camera image KB. The control unit 4 is thereby configured to regard one of the measuring areas 42 as impermissibly impaired (shown here in dark as an example) if the predetermined degree of impairment VBG is exceeded for this measuring area 42. The remaining measuring areas 42, which are considered by the control unit 4 to be unimpaired after the image analysis and thus suitable for displaying the rearward traffic situation RV, are shown here in white by way of example. The control unit 4 can be configured to no longer display the camera image KB on the output unit 3 if 10% or more of the measuring area 42 in the central main field 43 is considered to be impermissibly impaired.

Figure 4:
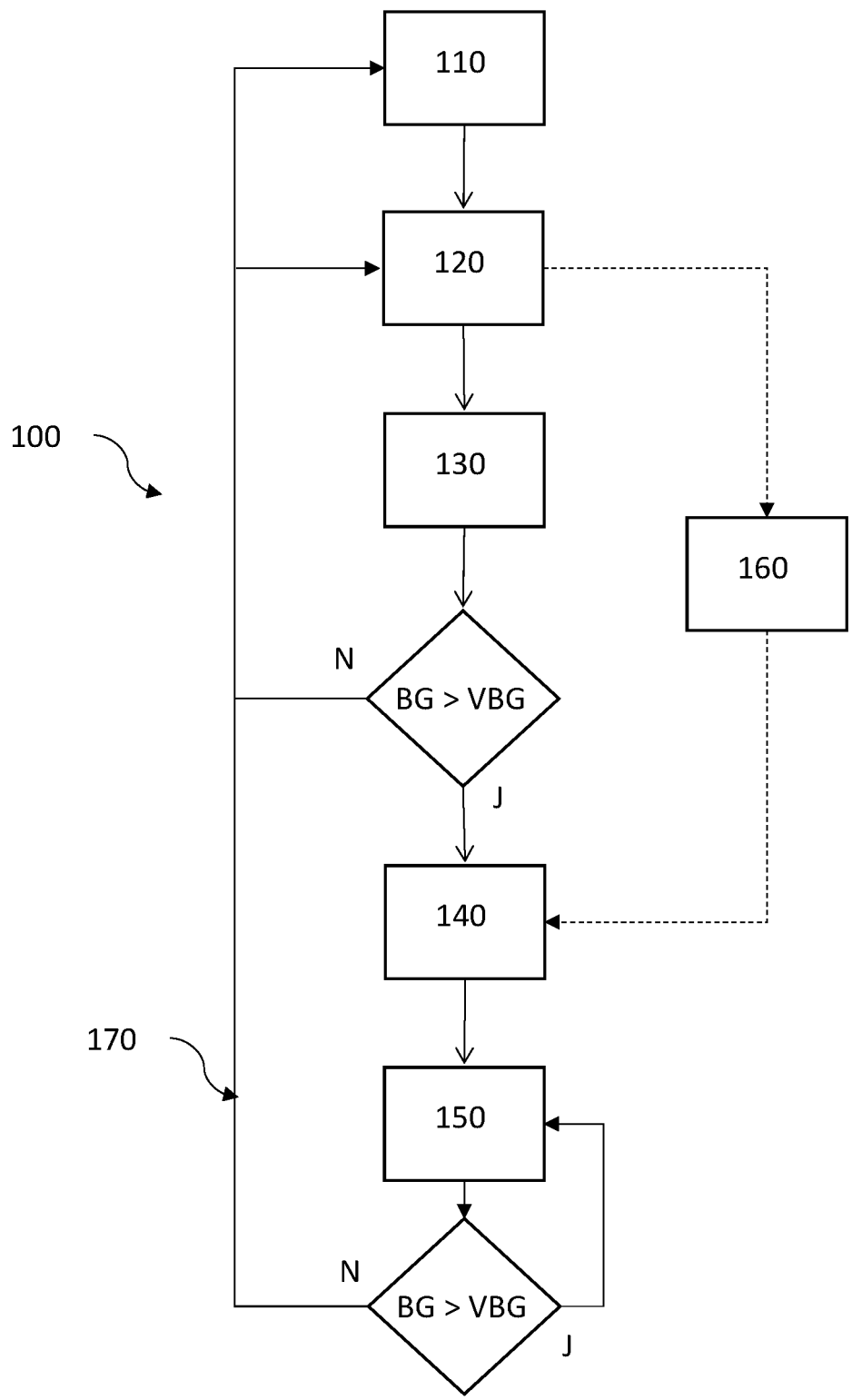
FIG. 4 is an embodiment of the method according to the invention for operating a rearview device for a motor vehicle.

FIG. 4 shows an embodiment of the method 100 according to the invention for operating a rearview device 1 for a motor vehicle 10 comprising a camera arrangement 2, an output unit 3, for example a screen 3, which is connected to the camera arrangement 2 and is at least partially reflective in regions, and a control unit 4, comprising the steps of capturing 110 a rearward traffic situation RV with the camera arrangement 2; displaying 120 the rearward traffic situation RV captured by the camera arrangement 2 as a camera image KB for a driver 5 of the motor vehicle 10 on the output unit 3 with suitable image properties which make a conventional mirror image SB of the partially reflective output unit at least predominantly invisible; determining 130 a degree of impairment BG of the camera image KB by the control unit 4; automatically activating 140 the output unit 3 by the control unit 4 in such a way that when a predetermined degree of impairment VBG (degree of impairment BG is greater than the predetermined degree of impairment VGB=Y) is exceeded, the camera image KB is no longer displayed on the output unit 3, wherein when the degree of impairment BG is less than or equal to the predetermined degree of impairment VGB (=N), both the detection 110 of the rearward traffic situation and its displaying 120 on the output unit 3 are continued; and the visible imaging 150 of the rearward traffic situation RV at least in areas on the output unit 3 by means of the conventional mirror image SB of the rearward traffic situation RV in case "Y". Here, the degree of impairment BG of the camera image KB may be caused due to contamination of the camera arrangement 2. Here, the degree of impairment BG of the camera image KB in a two-dimensional arrangement 41 of measuring areas 42 in the camera image KB may be determined separately for each measuring area 42 by the control unit 4. The method may further comprise the further step of not displaying 160 the camera image KB on the output unit 3 if there is a non-contamination related interference that may affect the observation of the rearward traffic situation RV. In this embodiment, the control unit 4 further checks the camera images KB frame-by-frame when the output unit 3 is turned off or is in a stand-by mode to determine elimination of the contamination or non-contamination related disturbance. The control unit 4 may then consider one of the measuring areas 42 to be impermissibly impaired if the predetermined degree of impairment VBG for that measuring area 42 is exceeded. In this case, the control unit 4 can no longer display the camera image KB on the output unit 3 if 20% or more of the measuring areas 42 are considered impermissibly impaired, or if 10% or more of the measuring areas 42 in the central main field 43 are considered impermissibly impaired. If the degree of impairment BG is again less than the predetermined degree of impairment VBG, the control unit 4 detects this and switches the output unit 3 on again in response in step 170. In a further embodiment (not shown in detail here), the driver 5 of the motor vehicle 10 can furthermore manually enter whether the rearview device 1 is to be operated in an electronic mode (displaying 120 of the rearward traffic situation RV captured by the camera arrangement 2 as a camera image KB) or in a reflective mode (visible imaging 150 of the rearward traffic situation RV at least in areas on the output unit 3 by means of the conventional mirror image SB), the electronic mode always being set by default when the motor vehicle is put into operation.

The embodiments shown here are only examples of the present invention and must therefore not be understood as limiting. Alternative embodiments contemplated by the skilled person are equally encompassed by the scope of protection of the present invention.

LIST OF REFERENCE SIGNS 1 rearview device according to the invention
2 Camera arrangement
3 Output unit (for example, a screen or monitor)
4 Control unit for determining a degree of impairment of the camera image and controlling the output unit based thereon
41 two-dimensional arrangement of measuring areas
42 Measuring areas in the camera image to determine the local degree of impairment
43 central main field with several measuring areas in the central area of the camera image
5 Driver of the motor vehicle
10 Motor vehicle
100 Method according to the invention for operating a rearview device for a motor vehicle
110 Capturing a rearward traffic situation with the camera arrangement
120 Displaying the rearward traffic situation captured by the camera arrangement (2) as a camera image on the output unit
130 Determining a degree of impairment of the camera image due to contamination
140 Activating the output unit so that the camera image is no longer displayed on the output unit
150 Imaging the rearward traffic situation on the output unit using the conventional mirror image
160 Camera image is no longer displayed on the output unit if there is a malfunction not caused by contamination
170 Switching on the output unit after detecting a removal of contamination or non-contamination-related disturbance
BG degree of impairment of the camera image (e.g. due to contamination of the camera arrangement)
KB Camera image RV rearward traffic situation
SB Mirror image
VBG predetermined degree of impairment

What is claimed is:

1. A method for operating a rearview device for a motor vehicle comprising a camera arrangement, an output unit including a screen, which is connected to the camera arrangement and is at least partially reflective in areas, and a control unit, comprising:
capturing a rearward traffic situation with the camera arrangement;
displaying the rearward traffic situation captured by the camera arrangement as a camera image for a driver of the motor vehicle on the output unit with suitable image properties which make a conventional mirror image of the partially reflective output unit at least predominantly invisible;
determining a degree of impairment of the camera image by the control unit;
automatically activating the output unit by the control unit in such a way that when a predetermined degree of impairment is exceeded, the camera image is no longer displayed on the output unit; and
visible imaging of the rearward traffic situation at least in areas on the output unit by means of the conventional mirror image of the rearward traffic situation,
wherein a degree of impairing of the camera image is caused due to contamination of the camera arrangement, and the control unit detects a removal of the contamination or a non-contamination-related disturbance and, in response thereto, switches the output unit back on.

2. The method according to claim 1, comprising the further step of no longer displaying the camera image on the output unit if there is a non-contamination-related disturbance that may affect the observation of the rearward traffic situation.

3. The method according to claim 1, wherein the degree of impairment of the camera image in a two-dimensional arrangement of measuring areas in the camera image is determined separately for each measuring area by the control unit.

4. The method according to claim 3, wherein the control unit considers one of the measuring areas as impermissibly impaired if the predetermined degree of impairment for this measuring area is exceeded.

5. The method according to claim 4, wherein the control unit no longer displays the camera image on the output unit if 20% or more of the measuring areas are considered impermissibly impaired or when 10% or more of the measuring areas in the central main field are considered impermissibly impaired.

6. The method according to claim 1, wherein the control unit, with the output unit switched off or being in a stand-by mode, further checks the camera images frame-by-frame to determine a removal of the contamination or the non-contamination related disturbance.

7. The method according to claim 1, wherein the driver of the motor vehicle manually inputs, whether the rearview device is to be operated in an electronic mode by means of displaying the rearward traffic situation recorded by the camera arrangement as a camera image or in a reflective mode by means of visible imaging of the rearward traffic situation at least in regions on the output unit by means of the conventional mirror image, the electronic mode always being set by default when the motor vehicle is put into operation.

8. The method according to claim 1, wherein the output unit is partially reflective at least in regions and, without a displayed camera image, visibly displays a conventional mirror image of the rearward traffic situation at least in regions of the output unit and, in a switched-on state, displays a camera image with suitable image properties which make the conventional mirror image appear at least predominantly invisible.

9. The method according to claim 1, wherein the degree of impairment of the camera image is caused due to at least one of contamination of the camera assembly or one or more non-contamination contamination-related disturbances from the group of a low charge status of an electric battery in an electric vehicle, a jerky camera image, a flickering camera image, a still image, and an EMC effect.

10. The method according to claim 1, wherein the degree of impairment of the camera image is determined in a two-dimensional arrangement of measuring areas in the camera image separately for each measuring area.

11. The method according to claim 10, wherein the two-dimensional arrangement of measuring areas covers the entire camera image.

12. The method according to claim 10, wherein the measuring areas are arranged over the camera image and are square or rectangular with an edge ratio of small edge to large edge of more than 50%.

13. The method according to claim 10, wherein the two-dimensional arrangement comprises a central main field of a plurality of measuring areas covering a central region of the camera image.

14. The method according to claim 10, wherein one of the measuring areas is regarded as impermissibly impaired if the predetermined degree of impairment for this measuring area is exceeded.

15. The method according to claim 14, wherein the camera image is no longer displayed on the output unit if 20% or more of the measuring areas are regarded as impermissibly impaired or if 10% or more of the measuring areas in the central main field are regarded as impermissibly impaired.

16. The method according to claim 1, wherein the degree of impairment of the camera image is continuously determined.

17. The method according to claim 1, wherein the output unit is a full-surface partially reflective output unit which, without a displayed camera image, displays a conventional mirror image visibly over the entire output unit.

* * * * *